(12) United States Patent
Arul (10) Patent No.: US 10,859,103 B2
(45) Date of Patent: Dec. 8, 2020

(54) WELD JOINT ASSEMBLY

(71) Applicant: Caterpillar Inc., Peoria, IL (US)

(72) Inventor: Samuel Judson William Arul, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 846 days.

(21) Appl. No.: 15/484,287

(22) Filed: Apr. 11, 2017

(65) Prior Publication Data

US 2018/0291938 A1 Oct. 11, 2018

(51) Int. Cl.
*B62D 21/03* (2006.01)
*F16B 5/08* (2006.01)
*B62D 21/02* (2006.01)
*B62D 27/02* (2006.01)
*B23K 33/00* (2006.01)
*B23K 101/00* (2006.01)
*B23K 101/28* (2006.01)

(52) U.S. Cl.
CPC .............. *F16B 5/08* (2013.01); *B23K 33/008* (2013.01); *B62D 21/02* (2013.01); *B62D 27/023* (2013.01); *B23K 2101/006* (2018.08); *B23K 2101/28* (2018.08)

(58) Field of Classification Search
CPC .... B62D 21/03; B62D 25/2054; B62D 25/20; B23K 33/004; B23K 33/008; B23K 2101/006; B23K 2101/28
See application file for complete search history.

(56) References Cited

U.S. PATENT DOCUMENTS

| | | | | |
|---|---|---|---|---|
| 1,290,091 A | * | 1/1919 | Cole | E04F 19/061 52/459 |
| 5,322,208 A | * | 6/1994 | Hinrichs | B23K 9/025 228/182 |
| 5,555,699 A | | 9/1996 | Borthick et al. | |
| 5,723,225 A | | 3/1998 | Yasui et al. | |
| 6,000,719 A | * | 12/1999 | Kocer | B62D 27/023 280/781 |
| 6,189,901 B1 | | 2/2001 | Smith et al. | |
| 6,237,303 B1 | * | 5/2001 | Allen | E04B 1/2403 52/653.1 |
| 6,568,744 B2 | * | 5/2003 | Fujan | B23K 33/008 296/183.2 |

(Continued)

FOREIGN PATENT DOCUMENTS

CA 2 841 593 * 1/2013 ............. B62D 25/20

*Primary Examiner* — Michael P Ferguson
(74) *Attorney, Agent, or Firm* — Oblon, McClelland, Maier & Neustadt (57) ABSTRACT

A weld joint assembly is provided. The weld joint assembly includes a first structural member having a first thickness. The weld joint assembly also includes a second structural member having a second thickness. The first thickness is different from the second thickness. The second structural member is connected to the first structural member through a weld joint. A plate is connected to the first and second structural members through the weld joint. The plate has a third thickness. The plate extends and abuts a surface of one of the first and second structural members and is welded thereto at outer edges of the plate leading away from the weld joint. At least a portion of the outer edge of the plate that is opposite to the weld joint is free of attachment to the surface.

14 Claims, 6 Drawing Sheets

(56) References Cited

U.S. PATENT DOCUMENTS

| | | | | |
|---|---|---|---|---|
| 8,074,359 | B2 * | 12/2011 | Bong | B23K 33/004 |
| | | | | 29/897.3 |
| 8,898,907 | B1 | 12/2014 | Bong | |
| 8,919,473 | B2 * | 12/2014 | Bisror | B62D 25/20 |
| | | | | 180/68.5 |
| 2009/0294426 | A1 * | 12/2009 | Bong | B23K 9/188 |
| | | | | 219/136 |
| 2016/0229367 | A1 | 8/2016 | Iwamoto et al. | |
| 2017/0314254 | A1 * | 11/2017 | Houghton | E04B 1/1912 |

* cited by examiner

WELD JOINT ASSEMBLY

TECHNICAL FIELD

The present disclosure relates to connection assemblies associated with structural members and more particularly to a weld joint assembly for the structural members.

BACKGROUND

Machines, for example, an off-highway truck, include a truck bed for carrying payload from one location to another. These truck beds or other structural components in the machine include a number of structural members, such as beams, rails, ribs, bolsters and so on that are connected to each other by weld joints.

In some situations two structural members that are to be connected may be of dissimilar thickness. During operation, the weld joint connecting the two structural members experiences high stress caused by, for example, torsional, compressive, and bending forces. This in turn may lead to low fatigue life of the weld joint. Some solutions include moving the weld joint to an area that experiences lower stress. However, such may not be plausible in certain assemblies and systems. Another solution includes increasing a thickness of the structural members to lessen or minimize the difference in the thickness. However, this may lead to an overall increase in weight of the system.

In other situations, the two structural members may be attached to each other such that one structural member is perpendicular to the other. The weld joint is formed at an intersection of the two structural members. During operation, the weld joint may experience high stress caused by a combination of torsional, bending, and compressive forces, affecting the fatigue life of the weld joint at the intersection. Known solutions may include increasing a thickness of the structural members and/or adding several sets of thick gussets. However, this may cause an increase in overall weight of the system.

U.S. Pat. No. 8,898,907 describes an automated assembly, system and method for a narrow-gap Electroslag-welded moment connection welded between horizontal beam to vertical column flanges. The assembly includes vertical column doubler plates affixed to the column web and horizontal beam doubler plates affixed to the beam web with alignment of the respective webs/doubler plates to carry the moment load through the vertical support columns. An embodiment includes a radius in each horizontal beam doubler plate.

SUMMARY OF THE DISCLOSURE

In one aspect of the present disclosure, a weld joint assembly is provided. The weld joint assembly includes a first structural member having a first thickness. The weld joint assembly also includes a second structural member having a second thickness. The first thickness is different from the second thickness. The second structural member is connected to the first structural member through a weld joint. A plate is connected to the first and second structural members through the weld joint. The plate has a third thickness. The plate extends and abuts a surface of one of the first and second structural members and is welded thereto at outer edges of the plate leading away from the weld joint. At least a portion of the outer edge of the plate that is opposite to the weld joint is free of attachment to the surface.

In another aspect of the present disclosure, a weld joint assembly is provided. The weld joint assembly includes a first structural member and a second structural member. The second structural member is positioned perpendicular to the first structural member. The second structural member is connected to the first structural member through a weld joint connection. A plate is welded to a surface of one of the first and second structural members along an outer edge of the plate leading away from the weld joint connection. The plate has an elongate shape and a tapering end positioned away from the weld joint connection. The outer edge of the tapering end is not welded to the surface.

In another aspect of the present disclosure, a weld joint assembly is provided. The weld joint assembly includes a first structural member and a second structural member connected to the first structural member through a weld joint. A plate is attached to a surface of any one of the first and second structural members. The plate is defined by three straight edges and one curved edge. The plate is welded to the surface along the three straight edges and is not welded to the surface along the one curved edge.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
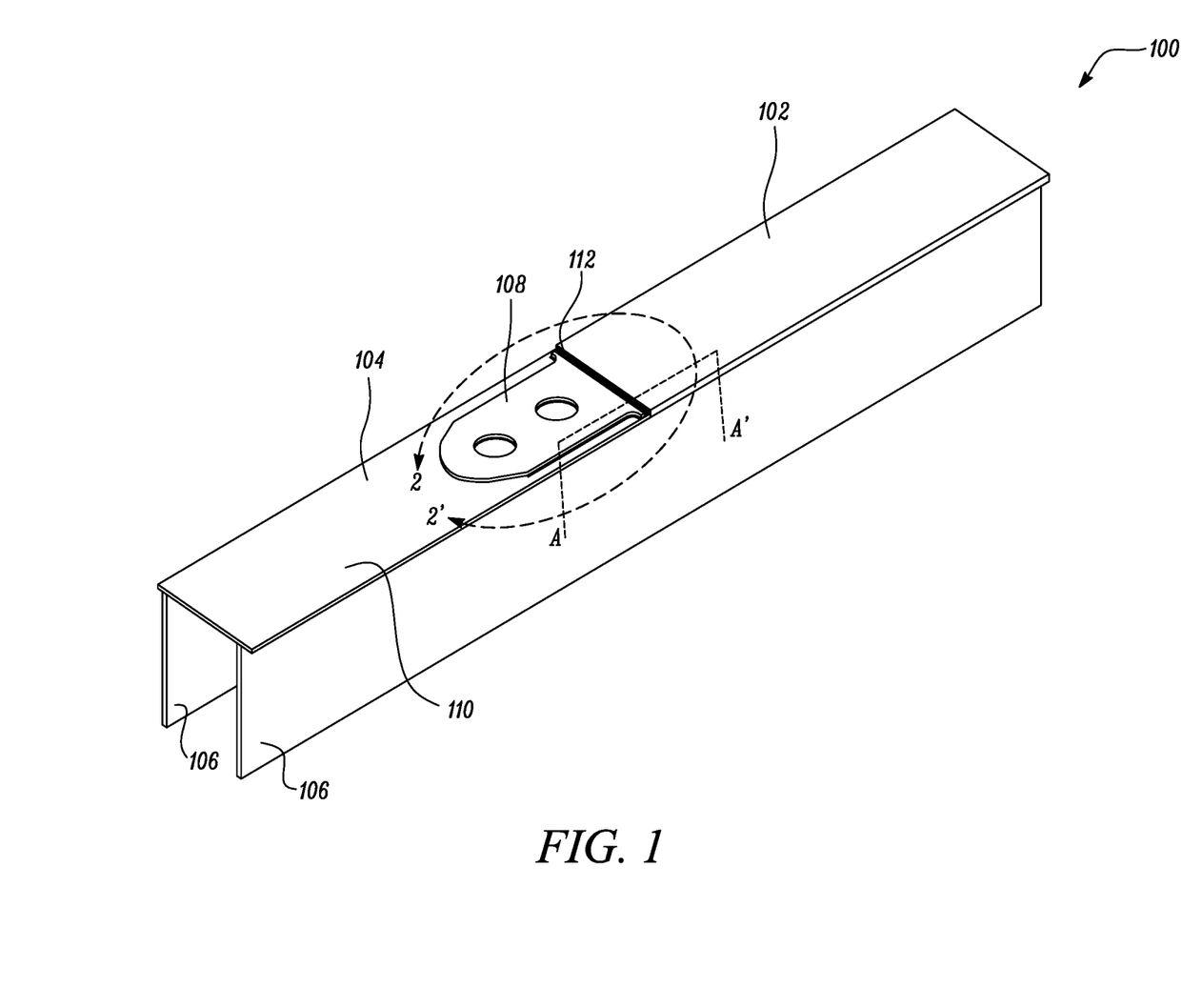
FIG. 1 is a perspective view of an exemplary weld joint assembly including a first structural member, a second structural member, and a plate, according to various concepts of the present disclosure.

FIG. 1 illustrates an exemplary weld joint assembly 100. The weld joint assembly 100 includes a first structural member 102 and a second structural member 104. The first structural member 102 is positioned adjacent to the second structural member 104. The first and second structural members 102, 104 are attached to support members 106. A person of ordinary skill in the art will appreciate that the number, structure, and design of the structural members 102, 104 shown herein are exemplary and do not limit the scope of the invention. Alternatively, the first and second structural members 102, 104 may be connected to any other type of structural members or supporting members not shown herein. For example, the first and second structural members 102, 104 may be present at different locations on a frame of a machine, under a truck bed of the machine, and so on.

Figure 3:
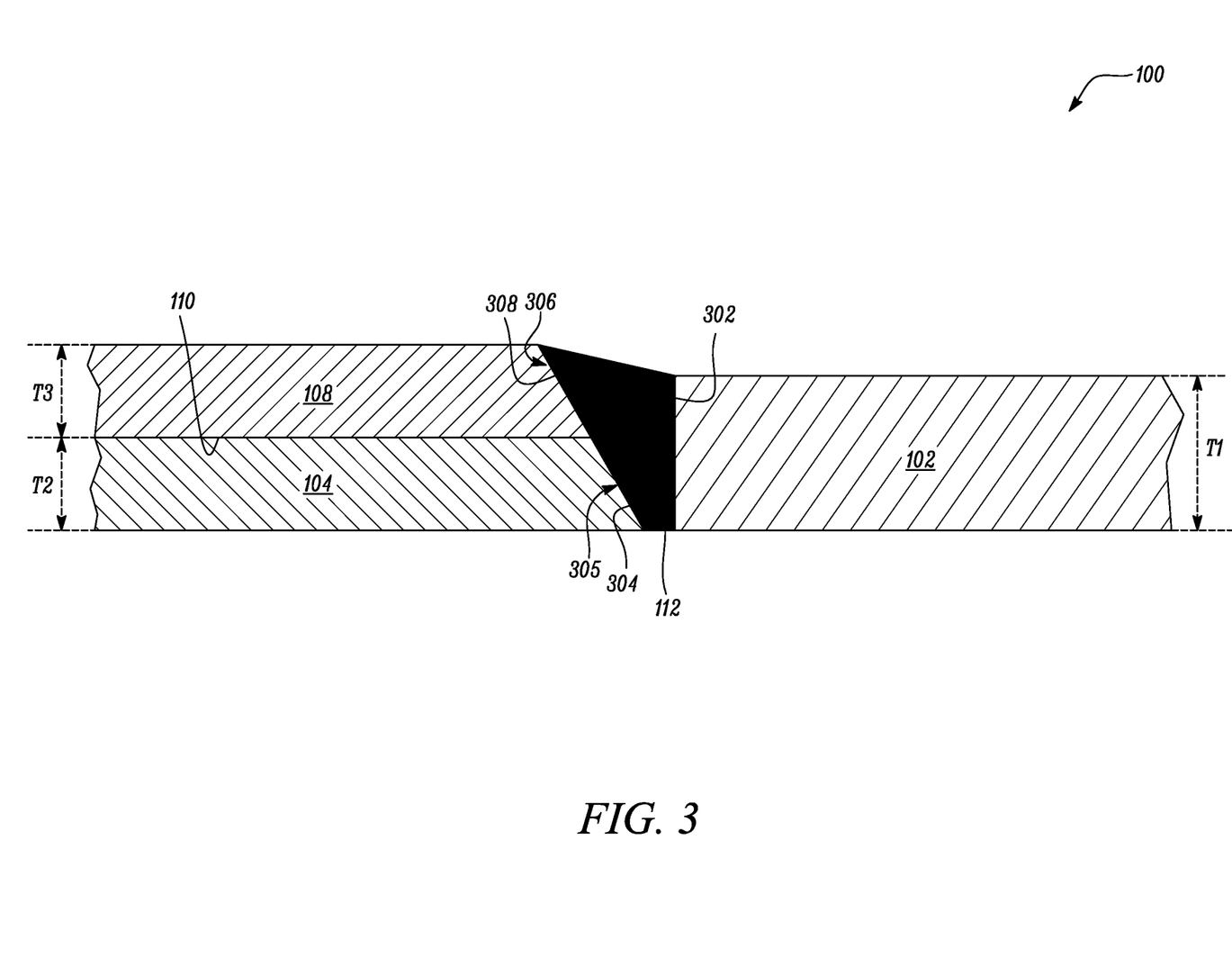
FIG. 3 is cross-sectional view of the weld joint assembly along plane A-A' of FIG. 1 showing the plate, the first structural member, and the second structural member, according to various concepts of the present disclosure.

Referring to FIG. 3, the first structural member 102 has a thickness T1. The second structural member 104 has a thickness T2. The thickness T1 is different from the thickness T2. As shown in the accompanying figures, the thickness T1 of the first structural member 102 is greater than the thickness T2 of the second structural member 104. In other examples, the thickness T1 of the first structural member 102 may be lesser than the thickness T2 of the second structural member 104. The first and second structural members 102, 104 have flat, plate-like configuration. In other embodiments, the shape and dimensions of the first and second structural 102, 104 members may vary.

An outer edge 302 of the first structural member 102 has a straight configuration. The second structural member 104 includes a chamfer 304 at an outer edge 305 of the second structural member 104. Alternatively, the first and second structural members 102, 104 may both have straight outer edges. In other embodiments, the first structural member 102 may also include a chamfer (not shown) on the outer edge 302 thereof. In yet another embodiment, the first structural member 102 or the second structural member 104 may have a J shaped groove.

The present disclosure relates to a plate 108 (see FIG. 1) for attachment on the first structural member 102 and/or the second structural member 104. The plate 108 abuts a surface of the structural member that is relatively thinner than the other structural member. The plate 108 is shown attached to the surface 110 of the second structural member 104. The plate 108 is positioned such that an outer edge 306 of the plate 108 aligns with the chamfer 304 provided on the outer edge 305 of the second structural member 104 (see FIG. 3). The plate 108 may include a chamfer 308 on the outer edge 306 of the plate 108 that connects with a weld joint 112 (see FIG. 1). In some embodiments, the weld joint 112 is a groove weld joint. The weld joint 112 attaches the first structural member 102, the second structural member 104, and the plate 108 at respective outer edges 302, 305, 306 thereof.

Figure 2:
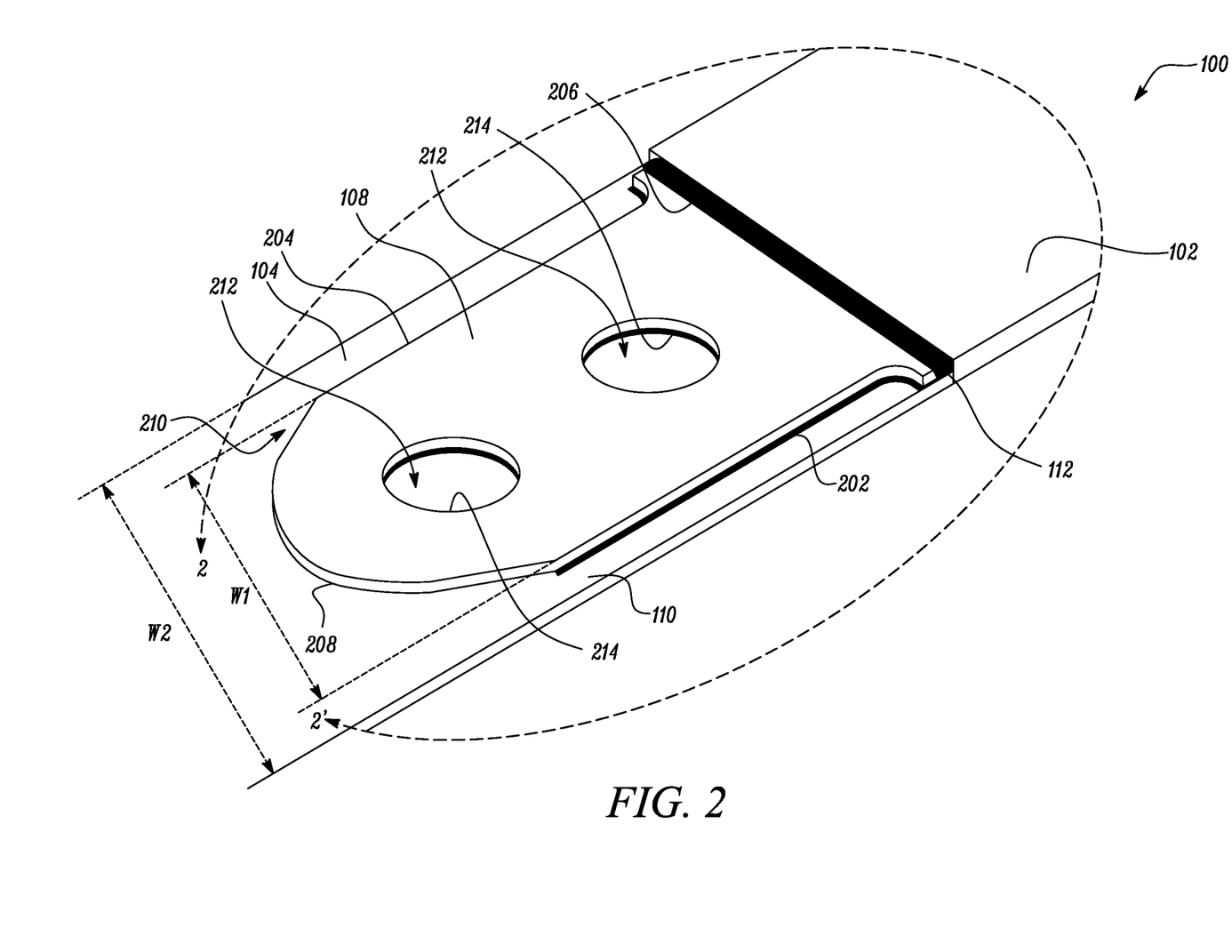
FIG. 2 is an enlarged view of an encircled portion 2-2' of FIG. 1 showing the plate, according to various concepts of the present disclosure.

Referring to FIGS. 1, 2, and 3 the plate 108 has a generally flat shape. The plate 108 is defined by three straight edges 202, 204, 206 and one curved edge 208. The plate 108 has an elongate and oblong shape such that an end of the plate 108 opposite to that connecting with the weld joint 112 tapers towards a central portion of the plate 108. Dimensions of the plate 108 and a radius of curvature of the curved edge 208 may vary based on the application. Two of the straight edges 202, 204 may be generally parallel to each other. A width W1 (see FIG. 2) of the plate 108 is lesser than a width W2 (see FIG. 2) of the surface 110 of the first and/or second structural members 102, 104 so that the plate 108 may be affixed to the surface 110 by welding. The plate 108 has a fixed thickness T3 such that the thickness T3 of the plate 108 is approximately equal to the thickness T2 of the second structural member 102 (see FIG. 3). Alternatively, the thickness T3 of the plate 108 may be either be lesser or greater than that of the first or second structural members 102, 104.

During installation, the plate 108 is made to flush against the surface 110 of the second structural member 104 in a manner such that the plate 108 extends along the surface 110 with the straight edge 206 connecting with the weld joint 112 and the curved edge 208 being positioned opposite to and distal from the weld joint 112. The plate 108 extends over and abuts the surface 110 of the second structural member 104. Further the plate 108 is attached to the surface 110 by welding. The outer edges of the plate 108 that lead away from the weld joint 112, which is the three straight edges 202, 204, 206 of the plate 108 are attached to the surface 110 of the second structural member 104 by welding. In some examples, the plate 108 is attached to the second structural member 104 by fillet welding. Additionally, a portion of the outer edge of the plate 108 is not attached to the second structural member 104. The portion of the outer edge of the plate 108 is located opposite to the straight edge 206 of the plate 108 that is in connection with the weld joint 112. More particularly, a tapering end 210 of the plate 108 that is defined by the curved edge 208 is not welded to the surface 110 and is free of attachment from the second structural member 104.

Referring to the accompanying figures, the plate 108 includes a number of cut-out sections 212. The cut-out sections 212 have a circular shape and are spaced apart from each other across a length of the plate 108. Alternatively, the cut-out sections 212 may have an elliptical shape, a rectangular shape, or any other enclosed shape. A perimeter 214 of each of the cut-out sections 212 is attached to the surface 110 of the second structural member 104. For example, the perimeter 214 of each of the cut-out sections 212 may be fillet welded to the surface 110 of the second structural member 104. Dimensions, for example, a thickness of the plate 108, the length of the plate 108, number and shape of the cut-out sections 212 and a material used to form the plate 108 may vary based on the system requirements. The material used to make the plate 108 may be structural steel, such that the yield strength of the material is greater than that of the weld joint 112.

Referring to FIG. 3, an exemplary cross section of the weld joint assembly 100 along the plane A-A' of FIG. 1 is illustrated. The weld joint 112 is shown as a bevel joint. In other embodiments, the weld joint 112 may be a V joint or any other known weld joint. Further, the number of welds may vary. A person of ordinary skill in the art will appreciate that although the plate 108 is shown attached to the surface 110 of the second structural member 104, in other applications, the plate 108 may be alternatively connected to both the first structural member 102 and the second structural member 104.

Figure 4:
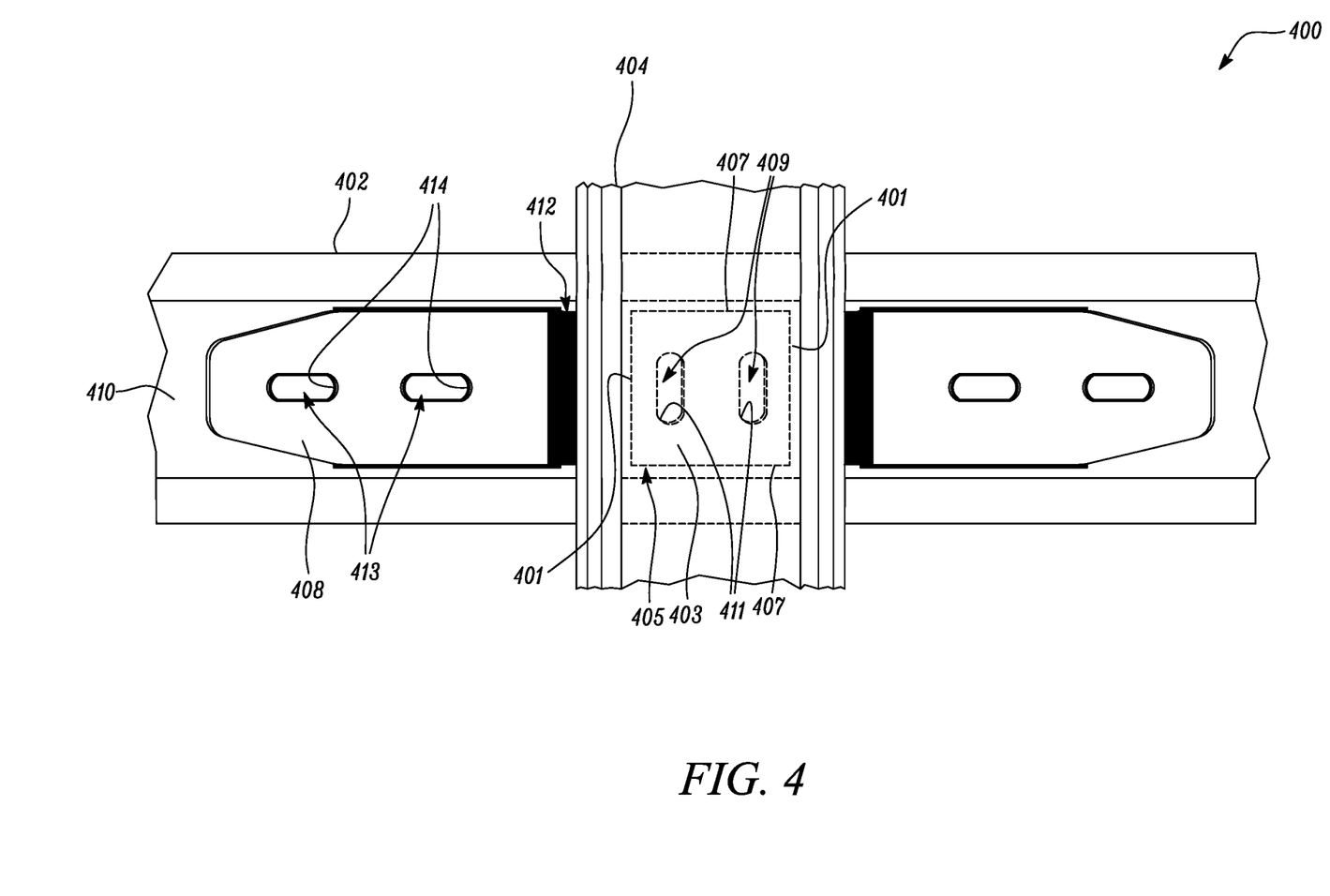
FIG. 4 is a top view of another weld joint assembly showing another embodiment of the plate, according to various concepts of the present disclosure.
Figure 5:
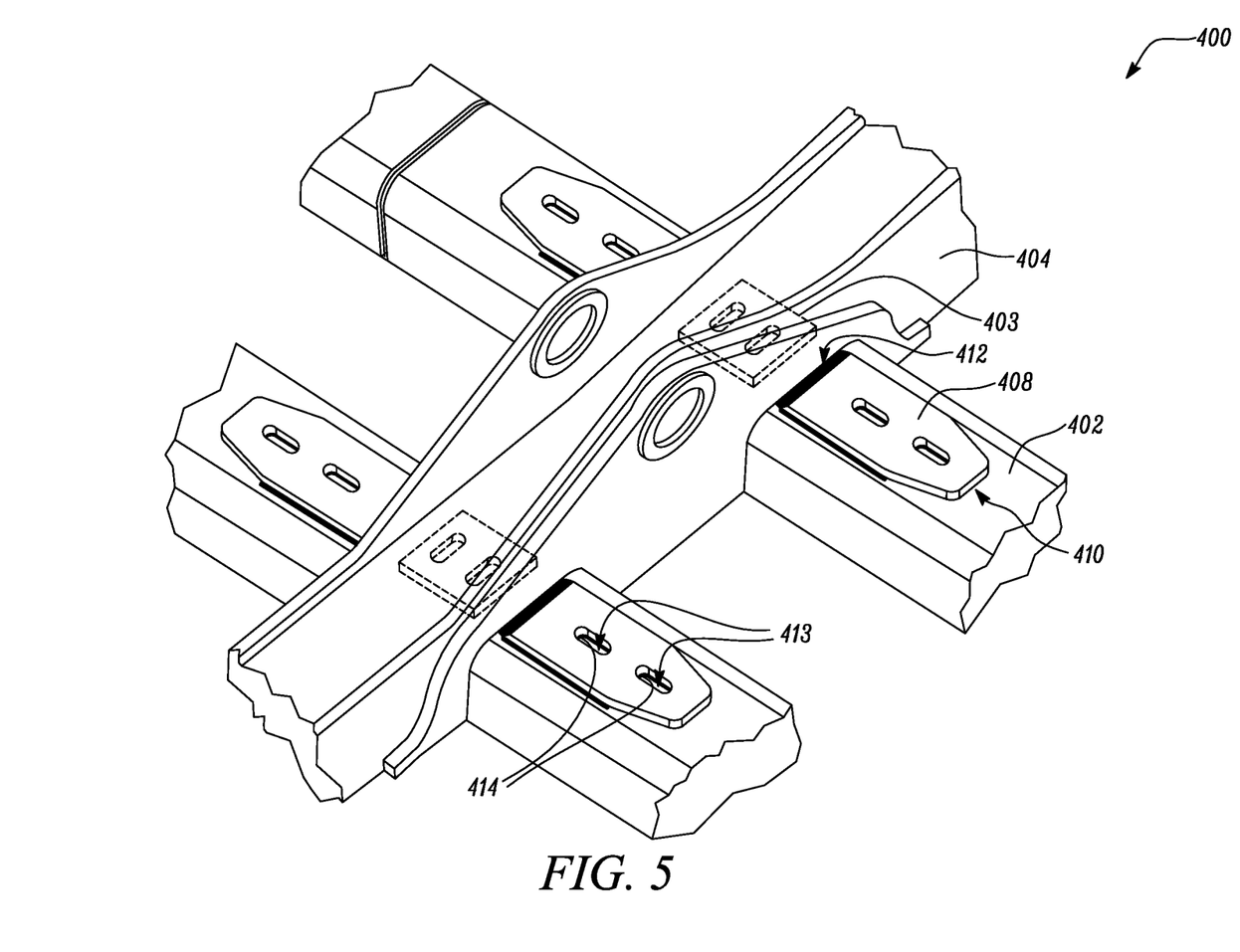
FIG. 5 is a perspective view of the weld joint assembly of FIG. 4, according to various concepts of the present disclosure.

FIGS. 4 and 5 illustrate another embodiment of the weld joint assembly 400. The first structural member 402 is embodied as a transverse structural member. The second structural member 404 is embodied as a lateral structural member. The first and second structural members 402, 404 are positioned perpendicular with respect to each other. The first and second structural members 402, 404 are connected to each other by a weld joint 412 connection.

A person of ordinary skill in the art will appreciate that the first and second structural members 402, 404 described and shown in the accompanying figures are exemplary and do not limit the scope of the present disclosure. The disclosure may be utilized in connection with any two structural members that are perpendicular to each other. In some embodiments, the first and second structural members 402, 404 described herein may be present at the underside of the truck bed of the machine. Alternatively, the first and second structural members 402, 404 may be present at any location on the frame of the machine or any other structural component of the machine.

A central plate 403 is connected to the first and second structural members 402, 404. The central plate 403 may have a square or rectangular shape and is generally flat. The central plate 403 is affixed to opposing and contacting surfaces of the first and second structural members 402, 404. Outer edges 405 of the central plate 403 are attached to the first and second structural members 402, 404 by welding (not shown). For example, opposing edges 401 of the central plate 403 may be groove welded to the first and/or second structural members 402, 404. Further, remaining opposing edges 407 of the central plate 403 may be fillet welded to the first and/or second structural members 402, 404.

The central plate 403 may additionally include cut-out sections 409. The cut-out sections 409 may have an oblong shape. In other embodiments, the cut-out sections 409 may have a different shape, for example, the cut-out sections 409 may be circular. The cut-out sections 409 are shown extending in the direction of the second structural member 404. Alternatively, the orientation, size, shape, and number of the cut-out sections 409 may vary without any limitation. A perimeter 411 of the cut-out sections 409 may be attached to the first structural member 402. For example, the perimeter 411 of the cut-out sections 409 may be fillet welded to the first structural member 402 for connection therewith.

Additionally, the plate 408 is welded to the surface of the first structural member 402. The plate 408 has a similar construction to that of the plate 108 explained above in connection with FIGS. 1 to 3. Further, a pair of the plates 408 may be positioned on either sides of the weld joint connection 412 as shown in FIGS. 4 and 5. Each plate 408 has the tapering end 410 extending from one side of the respective plate 408. The tapering end 410 may either have a curved and C type shape or a polygonal shape. The plates 408 are positioned such that a lower surface of the plate 408 abuts the surface of the first structural member 402 and the tapering end 410 is positioned away from the weld joint connection 412. A portion of the outer edge of the plate 408 proximate to the weld joint connection 412 may include the chamfer. The plates 408 additionally include the cut-out sections 413 that have an oblong or generally elliptical shape. Alternatively, the cut-out sections 413 may have a circular shape or any other enclosed shape.

The plates 408 are positioned such that each of the plates 408 extends along a length of the first structural member 402 and are perpendicular to the weld joint connection 412 and the second structural member 404. Each of the plates 408 are attached to the first structural member 402 by welding a portion of the outer edge of the plate 408. More specifically, the three straight edges of the plate 408 are welded to the surface of the first structural member 402. The tapering end 410 of the plate 408 is not welded to the first structural member 402 and is free. Further, the perimeter 414 of each of the cut-out sections 413 is welded to the first structural member 402. For example, the two opposing straight edges of the plate 408 may be fillet welded, the edge proximate to the weld joint connection 412 may be groove welded, and the perimeter 414 of the cut-out sections 413 may be fillet welded to the first structural member 402.

FIG. 5 is a portion of the underside of the truck bed of the machine. As can be seen, the pair of plates 408 may be present on each of the adjacent transverse structural members. It should be noted that the dimensions of the plate 408 and number of the plates 408 may vary based on the application.

Figure 6:
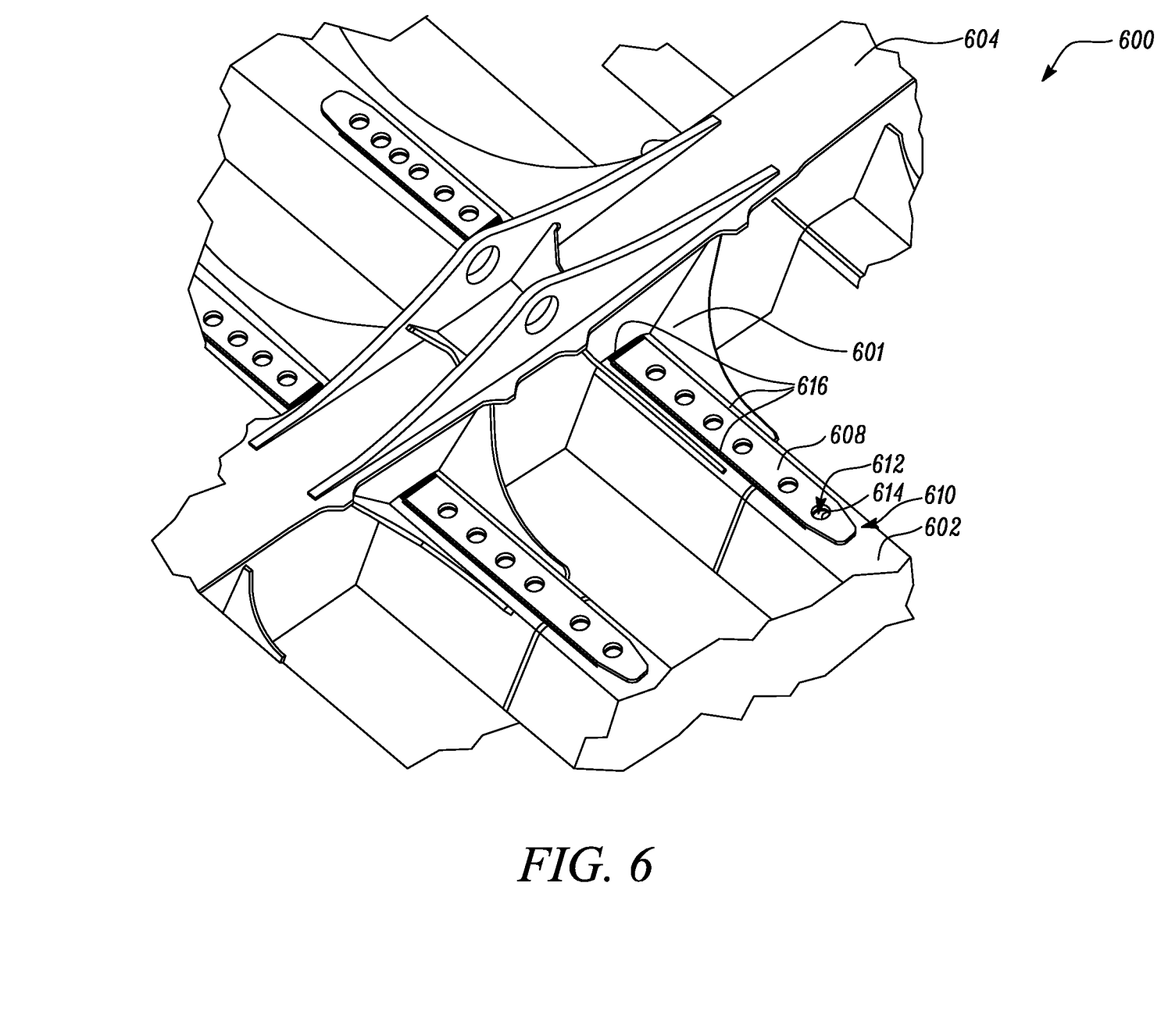
FIG. 6 is a perspective view of yet another weld joint assembly, according to various concepts of the present disclosure.

FIG. 6 illustrates another weld joint assembly 600. The plate 608 has a similar structure as described above in connection with FIGS. 1 to 5. The pair of the plates 608 is positioned on either side of the second structural member 604. The cut-out sections 612 extend along the length of each of the plates 608. The weld joint assembly 600 may additionally include gussets 601. The plate 608 is attached to the first structural member 602 by welding the straight edges 616 of the plate 608 and the perimeter 614 of the cut-out sections 612 of the plate 608. The tapering end 610 of the plate 608 is not attached to the first structural member 602.

The presence of the plate 608 may alleviate a failure mode of the gussets 601. The gussets 601 may otherwise be prone to low life at areas where the gussets 601 connect with the first and second structural members 602, 604. Attachment of the plate 608 proximate to the gussets 601 in machines that already have the gussets 601 installed thereon may assist in reducing the stress at connection points of the gussets 601, improving the life of the gussets 601.

INDUSTRIAL APPLICABILITY

The present disclosure relates to the plates 108, 408, 608 and a combination of associated welding techniques for use on structural members 102, 104 having dissimilar thickness and are welded together, as well as other structural members 402, 404, 602, 604 that are positioned perpendicular to each other and welded together. The plates 108, 408, 608 may increase an overall thickness of the respective surfaces to which the plate 108, 408, 608 is attached and may also increase the bending resistance of the respective structural member to which the plate 108, 408, 608 is attached.

In case of the first and second structural members 102, 104 having different thicknesses, the plate 108 is positioned on the second structural member 104 having the thickness T2 which is lesser than the thickness T1 of the first structural member 102. The plate 108 is welded along the weld joint 112 to improve a fatigue life of the weld joint 112. During operation, the first and second structural members 102, 104 may experience torsional, compressive and bending forces or a combination thereof, causing high stress at the curved edge 208 of the plate 108. The curved edge 208 of the plate 108 is not welded to the surface 110, allowing an area which may experience the highest stress to be free of lesser strength weld material.

The perimeter 214 of the cut-out-sections 212 provided on the plate 108 are welded to the surface 110, increasing contact between the plate 108 and the second structural member 104. This may also allow the stresses experienced by the surface 110 and the plate 108 to be distributed evenly, increasing the effectiveness and flexibility of the plate 108. Under loaded conditions, the structure of the plate 108 and the combination of the welding techniques used on the plate 108 may cause the bend point to move towards the curved edge 208 of the plate 108 or the tapering ends 410, 610 of the respective plates 408, 608. Since this curved edge 208 and the tapering ends 410, 610 are free of lesser strength weld material, each of the curved edge 208 and the tapering ends 410, 610 may make contact with the underlying surfaces 110. This may lower stress concentration as stresses are distributed evenly along the surface of the plate 108, 408, 608 near the curved edge 208 or the tapering ends 410, 610 respectively.

In case of the first and second structural members 402, 404, 602, 604 that are placed perpendicular to each other, the plate 408, 608 may be positioned on one of the structural members having a relatively shorter length and/or height, which is the respective first structural member 402, 602, proximate to the intersection of the first and second structural members 402, 404, 602, 604. The presence of the plate 408, 608 may increase the second moment of inertia along the bending and axial direction of the respective first structural member 402, 602, reducing stress at that location.

Further, by not welding the respective tapering ends 410, 610, the area of the system that may undergo highest deformation and stress when in use, is free of the lesser strength weld material due to absence of the welding. Additionally, the absence of welding at the respective tapering ends 410, 610 may allow the plates' material which is relatively thicker and stronger be utilized under compressive loading. The presence and the position of the cut-out sections 413, 612 on the respective plates 408, 608 may assist in dissipating stress gradually along the length of the plate 408, 608, making the respective first structural member 402, 602 and the plate 408, 608 behave as a single unit under loading.

The length, shape, and other dimensions of the plate 108, 408, 608 shown in the accompanying figures is exemplary and does not limit the scope of the present disclosure. Also, any number of the plates 108, 408, 608 may be used in connection with multiple number of the weld joints on differently shaped structural members based on the requirements of the system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A weld joint assembly comprising:
  a first plate-shaped structural member having a first thickness;
  a second plate-shaped structural member having a second thickness, wherein the first thickness is thicker than the second thickness, and wherein the second structural member is connected to the first structural member through a weld joint extending along abutting edges thereof; and
  a planar plate having opposing proximal and distal end portions and opposing parallel sides extending therebetween, the plate being superposed upon a surface of the second structural member and being connected to the first and second structural members through the weld joint along the outer edge of the proximal end portion, the plate having a third thickness, and the outer edge of the distal end portion having a convex or tapered shape;
  wherein the planar plate includes at least one cut-out section extending therethrough, one of the at least one cut-out sections having a peripheral shape which is partially disposed between the opposing sides and extends within the distal end portion, and wherein the perimeter of each cut-out section is welded to the surface,
  wherein the planar plate is welded to the surface along the outer edges of the proximal end portion and the opposing sides, and
  wherein the outer edge of the distal end portion is free of attachment to the surface and not welded thereto to allow for flexibility and distribution of stress along the outer edge of the distal end portion.

2. The weld joint assembly of claim 1, wherein the outer edge of the distal end portion of the planar plate has an oblong shape.

3. The weld joint assembly of claim 1, wherein the planar plate includes a plurality of cut-out sections.

4. The weld joint assembly of claim 3, wherein the perimeter of each of the plurality of cut-out sections is attached to the surface by fillet welding.

5. The weld joint assembly of claim 1, wherein the outer edge of the proximal end portion of the planar plate connects with the weld joint and includes a chamfer.

6. A weld joint assembly comprising:
  a first beam-shaped structural member;
  a second beam-shaped structural member having a notch transversely-extending through opposing longitudinally-extending sides thereof, wherein the first structural member longitudinally-extends through the notch perpendicular to the longitudinal axis of the second structural member, and wherein the second structural member is connected to the first structural member through a weld joint connection extending along abutting surfaces thereof on a first longitudinally-extending side of the second structural member; and
  a planar plate having opposing proximal and distal end portions and opposing parallel sides extending therebetween, the plate being superposed upon a surface of the first structural member on the first longitudinally-extending side of the second structural member and being welded to the first and second structural members through the weld joint connection along the outer edge of the proximal end portion, and the outer edge of the distal end portion having a tapered shaped,
  wherein the planar plate includes at least one cut-out extending therethrough, one of the at least one cut-outs having a peripheral shape which is partially disposed between the opposing sides and extends within the distal end portion, and wherein the perimeter of each cut-outs is welded to the surface,
  wherein the planar plate is welded to the surface along the outer edges of the proximal end portion and the opposing sides, and
  wherein the outer edge of the distal end portion is not welded to the surface to allow for flexibility and distribution of stress along the outer edge of the distal end portion.

7. The weld joint assembly of claim 6 further including a central plate provided at an intersecting portion of the first and second structural members, wherein an outer edge of the central plate is welded to the first and second structural members.

8. The weld joint assembly of claim 6, wherein a second said planar plate is attached to the surface of the first structural member on a second longitudinally-extending side of the second structural member.

9. The weld joint assembly of claim 6, wherein the plate includes a plurality of cut-outs.

10. The weld joint assembly of claim 9, wherein the perimeter of each of the plurality of cut-outs is attached to the surface by fillet welding.

11. The weld joint assembly of claim 6, wherein the outer edge of the proximal end portion of the plate connects with the weld joint and includes a chamfer.

12. A weld joint assembly comprising:
  a first plate-shaped structural member;
  a second plate-shaped structural member having a thickness less than the first structural member, wherein the second structural member is connected to the first structural member through a weld joint extending along abutting edges thereof; and
  a planar plate having opposing proximal and distal end portions and opposing parallel sides extending therebetween, the plate being superposed upon a surface of the second structural member and being attached to the first and second structural members through the weld joint along the outer edge of the proximal end portion, the proximal end portion and the opposing sides having straight outer edges and the distal end portion having a curved outer edge, wherein the planar plate includes a plurality of cut-outs extending therethrough arranged in a line in a length direction of the plate, one of cut-outs having a peripheral shape which is partially disposed between the opposing sides and extends within the distal end portion, and wherein the perimeter of each cut-out is welded to the surface, and wherein the planar plate is welded to the surface along the straight outer edges of the proximal end portion and the opposing sides, and is not welded to the surface along the curved outer edge of the distal end portion to allow for flexibility and distribution of stress along the outer edge of the distal end portion.

13. The weld joint assembly of claim 12, wherein the perimeter of each of the plurality of cut-outs is attached to the surface by fillet welding.

14. The weld joint assembly of claim 12, wherein the planar plate is attached to the first and second structural members present on an underside of a truck bed of a machine.

\* \* \* \* \*